United States Patent
Anno et al.

(10) Patent No.: US 7,753,082 B2
(45) Date of Patent: Jul. 13, 2010

(54) TUBE

(75) Inventors: Toshiaki Anno, Machida (JP); Yoshiharu Wada, Kiryu (JP)

(73) Assignees: Nissan Motor Co., Ltd., Yokohama-shi (JP); Mitsuba Corporation, Kiryu-shi (JP)

(*) Notice: Subject to any disclaimer, the term of this patent is extended or adjusted under 35 U.S.C. 154(b) by 0 days.

(21) Appl. No.: 12/213,340

(22) Filed: Jun. 18, 2008

(65) Prior Publication Data

US 2009/0000053 A1   Jan. 1, 2009

(30) Foreign Application Priority Data

Jun. 28, 2007 (JP) .............................. 2007-170912
Feb. 15, 2008 (JP) .............................. 2008-034713

(51) Int. Cl.
*F16L 55/00* (2006.01)

(52) U.S. Cl. .................. 138/108; 138/110; 138/112; 138/113; 138/115; 15/250.351

(58) Field of Classification Search ................ 138/110, 138/108, 112, 113, 115; 15/250.351
See application file for complete search history.

(56) References Cited

U.S. PATENT DOCUMENTS

| | | | | |
|---|---|---|---|---|
| 417,992 | A * | 12/1889 | Dell | 138/114 |
| 3,537,485 | A * | 11/1970 | March | 138/115 |
| 3,805,847 | A * | 4/1974 | Manning | 138/115 |
| 3,941,157 | A * | 3/1976 | Barnett | 138/115 |
| 4,729,409 | A * | 3/1988 | Paul | 138/115 |
| 4,906,496 | A * | 3/1990 | Hosono et al. | 428/36.9 |
| 4,975,055 | A * | 12/1990 | LaPlante | 433/82 |
| 5,630,447 | A * | 5/1997 | Jensen | 138/115 |
| 5,865,215 | A | 2/1999 | Freed | |
| 6,453,950 | B1 * | 9/2002 | Smith | 138/115 |
| 2001/0003352 | A1 * | 6/2001 | Ruden et al. | 239/284.2 |
| 2002/0036019 | A1 * | 3/2002 | Woelfel et al. | 138/115 |
| 2006/0202516 | A1 * | 9/2006 | Mori | 296/192 |
| 2008/0223471 | A1 * | 9/2008 | Guo | 138/113 |

FOREIGN PATENT DOCUMENTS

| | | |
|---|---|---|
| DE | 93 14 906 U1 | 12/1993 |
| JP | 60-34863 Y2 | 10/1985 |
| KR | 10-2004-0027744 | 4/2004 |

\* cited by examiner

*Primary Examiner*—James F Hook
(74) *Attorney, Agent, or Firm*—Foley & Lardner LLP

(57) ABSTRACT

A tube which includes: a tube body portion through which a fluid flows; a protector portion having an interior hollow space in which the tube body portion is provided, and an exterior wall defining the interior hollow space and having a flat outer surface; and a supporting portion supporting the tube body portion inside the hollow space in a position spaced from an inner surface of the hollow space. The supporting portion extends from the exterior wall of the protector portion in a direction substantially perpendicular to the flat outer surface of the exterior wall and across the hollow space to support the tube body portion at a middle portion thereof.

4 Claims, 10 Drawing Sheets

TUBE

BACKGROUND OF THE INVENTION

1. Field of the Invention

The present invention relates to a tube, and particularly to a structure of a tube installed in a vehicle.

2. Description of the Related Art

Japanese Patent Utility Model No. S60-34863 discloses a tube to be used as a brake oil tube, a windshield washer fluid tube and the like, including a protector portion integrally formed with a tube body portion to protect the tube body portion from sands, stones or the like thrown up by vehicle tires.

This tube has a structure suitable for production by extrusion molding, in which a wall extending outward from the tube body portion and along the tube body portion in its longitudinal direction is formed integral with the protector portion with a space provided between the tube body portion and the protector portion.

SUMMARY OF THE INVENTION

In the case of the foregoing technique, however, the protector portion is likely to change in shape or collapse due to its own weight before the tube becomes fully solid immediately after the extrusion molding.

An object of the present invention is to provide a tube capable of preventing its protector portion from changing in shape or collapsing due to its own weight.

An aspect of the present invention is a tube comprising: a tube body portion through which a fluid flows; a protector portion having an interior hollow space in which the tube body portion is provided, and an exterior wall defining the interior hollow space and having a flat outer surface; and a supporting portion supporting the tube body portion inside the hollow space in a position spaced from an inner surface of the hollow space, wherein the supporting portion extends from the exterior wall of the protector portion in a direction substantially perpendicular to the flat outer surface of the exterior wall and across the hollow space to support the tube body portion at a middle portion thereof.

BRIEF DESCRIPTION OF THE DRAWINGS

The invention will now be described with reference to the accompanying drawings wherein:

FIG. 9A shows a cross-section of the tube immediately before the external force is applied to its protector portion. FIG. 9B shows a cross-section of the tube after the tube changes in shape or collapses due to the external force applied to its protector portion.

DESCRIPTION OF THE PREFERRED EMBODIMENT

Figure 1:
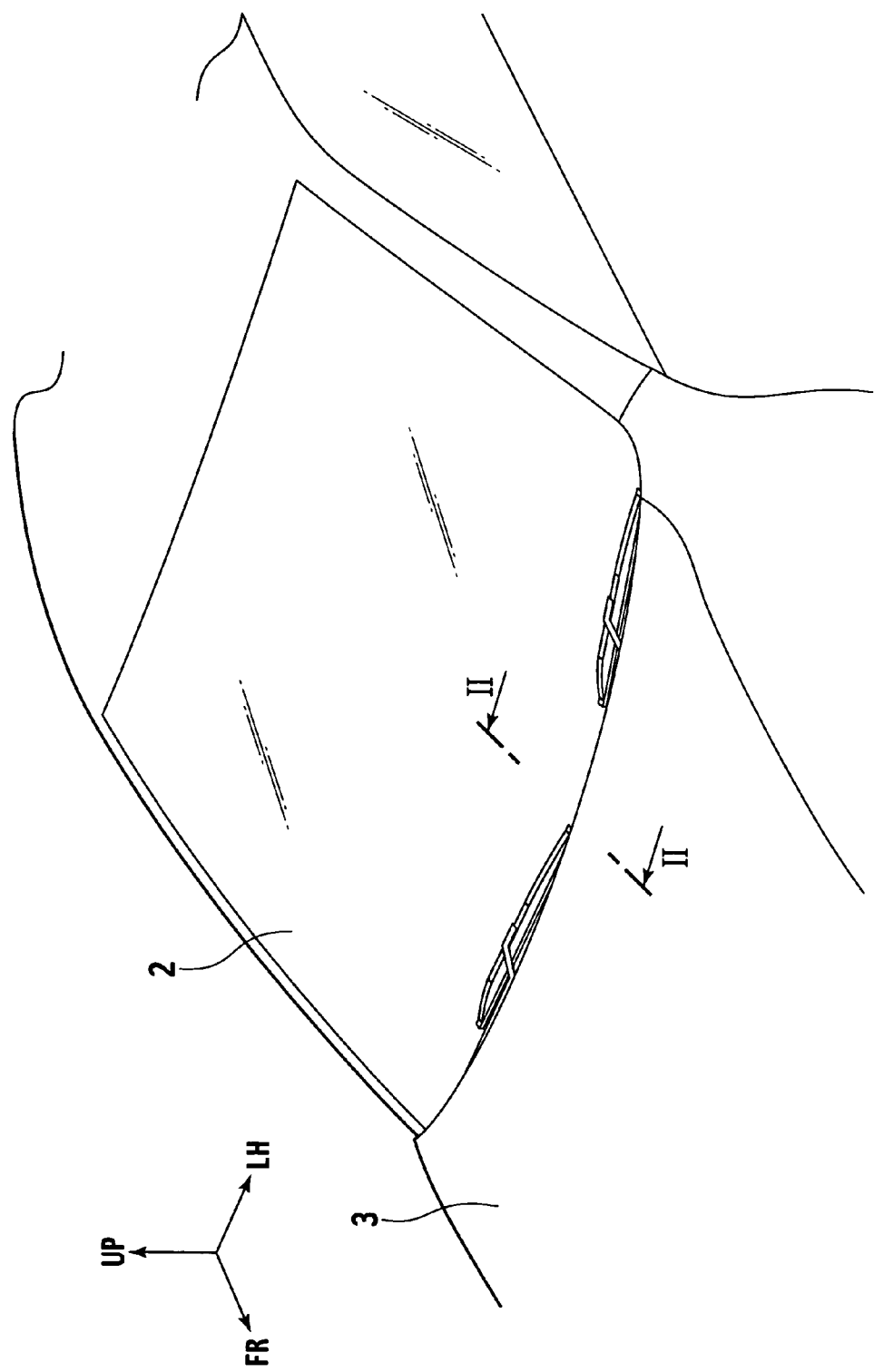
FIG. 1 shows a hood of a vehicle, on a rear surface of which a tube according to a first embodiment of the present invention is arranged.
Figure 2:
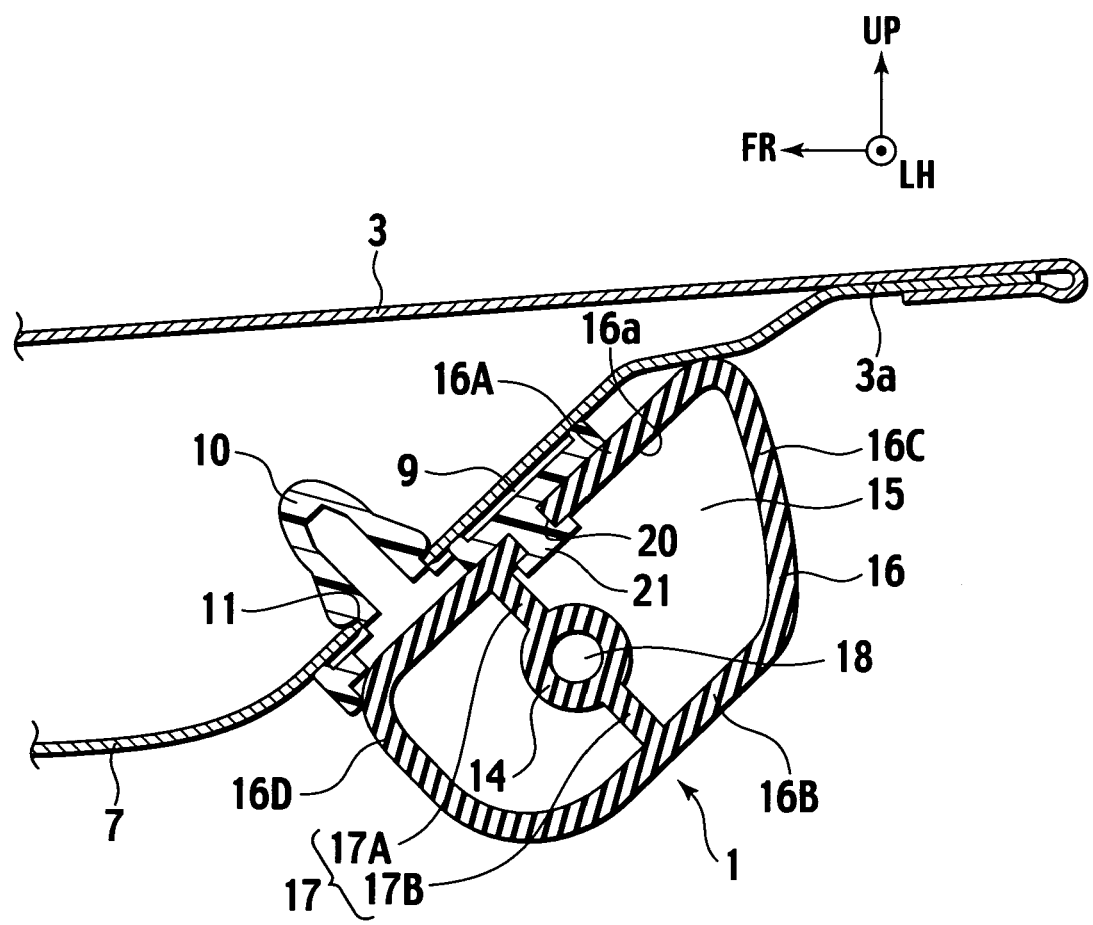
FIG. 2 is a cross-sectional view of FIG. 1 taken along the II-II line.
Figure 3:
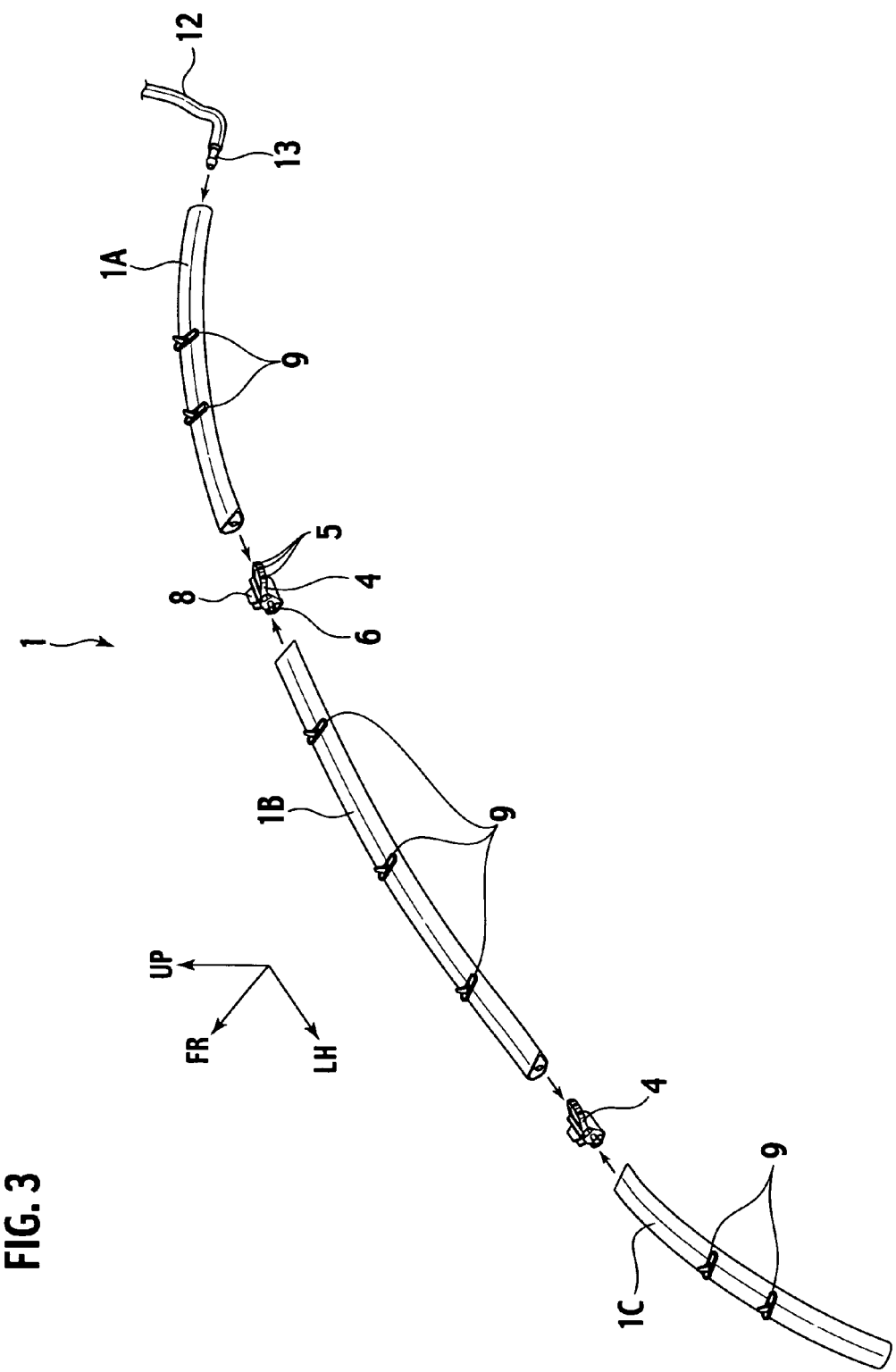
FIG. 3 is an exploded perspective view of the tube according to the first embodiment.
Figure 4:
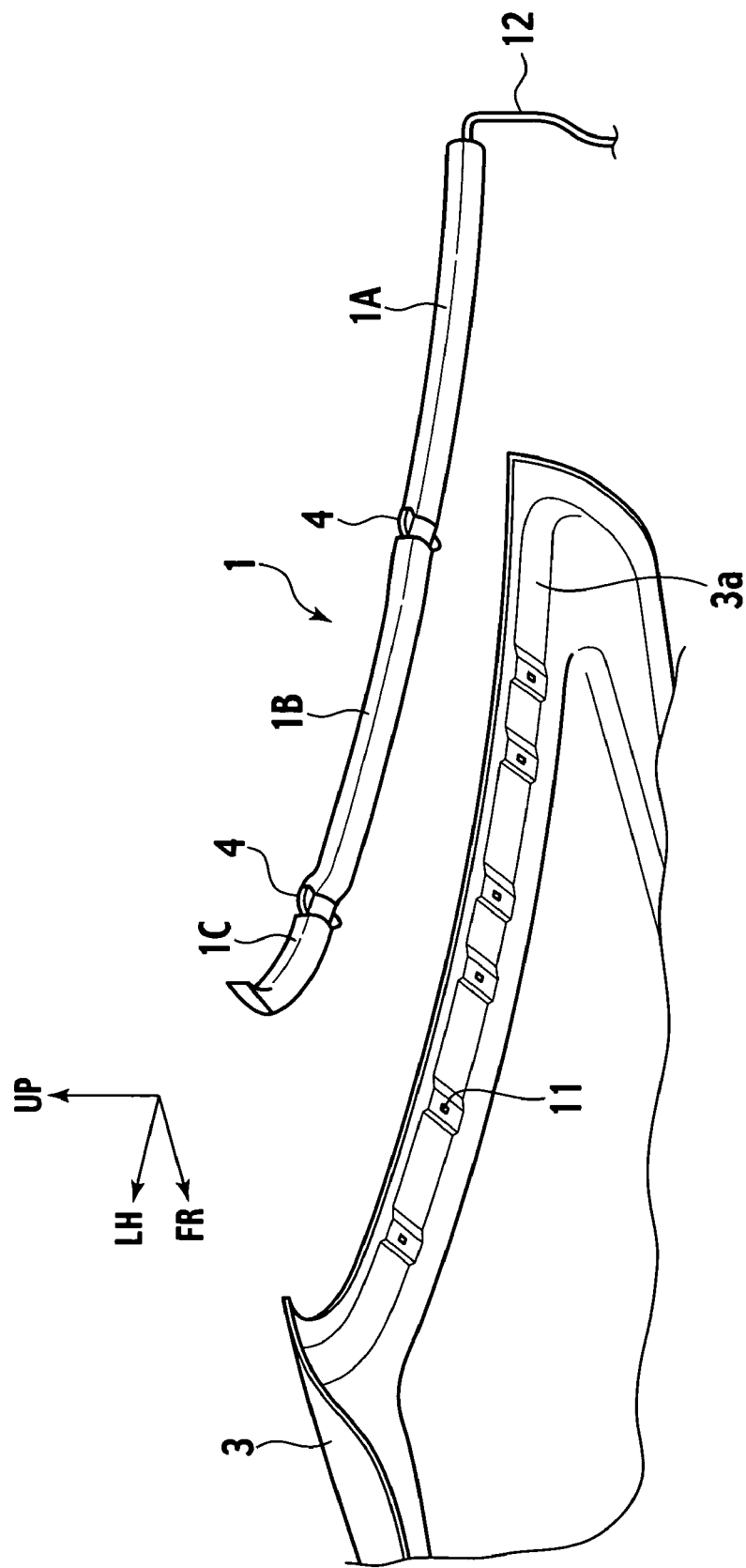
FIG. 4 shows how the tube according to the first embodiment is attached to the hood with a hood inner being detached from the hood.

Embodiments of the present invention will be described below with reference to the drawings. In the drawings, "UP," "FR," and "LH" respectively denote upward, toward the front of a vehicle, and toward the left of the vehicle in the vehicle width direction.

First Embodiment

A tube 1 according to a first embodiment is a windshield washer fluid supplying tube fixed to a rear surface (or a hood rear surface) 3a of a hood 3 facing a front windshield 2 of a vehicle, as shown in FIGS. 1 to 4.

The tube 1 is divided into three tubes 1A, 1B, and 1C in the longitudinal direction of the tube 1. The tubes 1A and 1B are connected to each other with a washer nozzle 4, and the tubes 1B and 1C are connected to each other with the other washer nozzle 4. Each of the washer nozzles 4 ejects a washer fluid to the windshield 2. Ejection ports 5, connecting pipes 6, and an attachment piece 8 are formed in each of the washer nozzles 4. The ejection ports 5 are that from which the washer fluid is ejected to the windshield 2. The connecting pipes 6 connect the tubes 1A and 1B to each other, or the tubes 1B and 1C to each other. The attachment piece 8 is attached to a rear end portion of a hood inner 7 provided to the hood rear surface 3a. One washer nozzle 4 is arranged between the tubes 1A and 1B, as well as the other washer nozzle 4 is arranged between the tubes 1B and 1C, with the connecting pipes 6 thereof joined to the respective end portions of the tubes 1A and 1B. By connecting the end portions of each pair of the tubes 1A and 1B and of the tubes 1B and 1C, with the connecting pipes 6 of the washer nozzle 4, the tubes 1A, 1B and 1C are formed into the tube 1.

Clip members 9 for attaching the tube 1 to the hood inner 7 are attached to each of the tubes 1A, 1B and 1C of the tube 1. Each of the clip members 9 has a locking protrusion 10. By pressing and locking this locking protrusion 10 into a corresponding one of tube attachment holes 11 formed in the hood inner 7, the tube 1 is attached to the hood 3.

A washer supplying pipe 12 connected to a washer fluid reservoir tank is connected to one end portion of the tube 1 obtained by connecting the tubes 1A, 1B, and 1C by use of the washer nozzles 4. A joint piece 13 is provided to the extremity of the washer supplying pipe 12, and is connected to the tube 1A.

Figure 5:
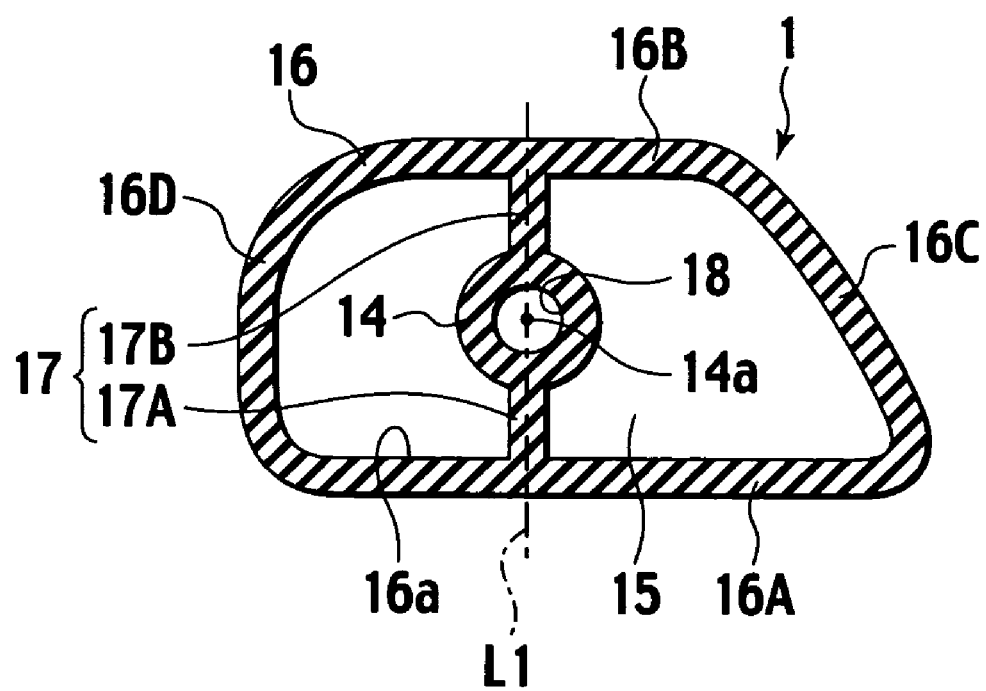
FIG. 5 is a cross-sectional view of the tube according to the first embodiment.

When viewing a cross-section of the tube 1 taken in a direction perpendicular to the longitudinal direction of the tube 1, as shown in FIG. 5, the tube 1 is formed to have a tube body portion 14, a protector portion 16, and a supporting portion 17 (or supporting sections 17A and 17B). The protector portion 16 covers or surrounds the tube body portion 14, and includes an interior hollow space 15 in its inside. The tube body portion 14 is provided through the hollow space 15. The supporting portion 17 supports the tube body portion 14 in a spaced position inside the interior hollow space 15, specifically, the tube body portion 14 is supported in a position spaced from an inner surface 16a of the hollow space 15.

The tube body portion 14 is formed as a circular pipe including a fluid channel 18 in which the washer fluid (or liquid) supplied from the washer supplying pipe 12 flows.

The protector portion 16 includes a tubular exterior wall defining the interior hollow space 15, which is formed to have a first flat wall 16A, a second flat wall 16B, a first connecting section 16C, and a second connecting section 16D. In this respect, the "flat wall" means a flat wall having its inner and outer surfaces being substantially flat and parallel to each other, or a flat wall having at least an outer surface thereof being substantially flat. The first flat wall 16A is attached to the hood rear surface 3a. The second flat wall 16B is arranged in a position opposed to the first flat wall 16A with the tube body portion 14 disposed between the first flat wall 16A and the second flat wall 16B, and in parallel to the first flat wall 16A. The first connecting section 16C is a wall connecting one end of the first flat wall 16A to one end of the second flat wall 16B. The second connecting section 16D is as wall connecting the other end of the first flat wall 16A to the other end of the second flat wall 16B. The first flat wall 16A, the second flat wall 16B, the first connecting section 16C, and the second connecting section 16D jointly forms the hollowed structure. The tube body portion 14 is arranged substantially in the center of the hollow space 15 of the hollowed structure. The protector portion 16 surrounds the tube body portion 14 arranged in the center portion thereof, and protects the tube body portion 14.

The first flat wall 16A has an attachment surface whose area is large enough for the first flat wall 16A to be attached to the hood inner 7 provided to the hood rear surface 3a. Clip member attaching holes 20 to which the corresponding clip members 9 are attached are formed in the first flat wall 16A. A locking protrusion 21 provided to each of the clip members 9 is inserted and locked into a corresponding one of the clip member attaching holes 20.

The first connecting section 16C is formed as an inclined wall inclined at an angle not equal to a right angle with respect to the first flat wall 16A. The first connecting section 16C connects one end of the first flat wall 16A (or the right end of the first flat wall 16A in FIG. 5) and one end of the second flat wall 16B. The second connecting section 16D is formed as a vertical wall extending substantially perpendicular to the flat outer surface of the first flat wall 16A, and connects a base end of the first flat wall 16A (or the left end of the first flat wall 16A in FIG. 5) to a base end of the second flat wall 16B.

The second flat wall 16B, the first connecting section 16C, and the second connecting section 16D, exclusive of the first flat wall 16A, function as a design surface constituting an external appearance of the tube 1 after the first flat wall 16A is attached to the hood inner 7.

The supporting portion 17 is a flat wall which extends from the first flat wall 16A in a direction substantially perpendicular to the flat outer surface of the first flat wall 16A and which extends across the hollow space 15 to be joined to the second flat wall 16B. The supporting portion 17 supports the tube body portion 14 at the middle portion of the supporting portion 17. The supporting portion 17 extends along the tube body portion 14 in the longitudinal direction of the tube body portion 14 so as to support the tube body portion 14 in its longitudinal direction.

The supporting portion 17 has a first supporting section 17A and a second supporting section 17B. The first supporting section 17A is a flat wall which is joined at both edges thereof respectively to the first flat wall 16A and the tube body portion 14. The second supporting section 17B is a flat wall which is joined at both edges thereof respectively to the second flat wall 16B and the tube body portion 14. The first supporting section 17A and the second supporting section 17B are arranged on a single straight line L1 which passes through a center 14a of the tube body portion 14 with a circular cross-section, and which is perpendicular to the flat outer surface of the first flat wall 16A and the second flat wall 16B. In other words, the first supporting section 17A and the second supporting section 17B are provided in positions opposed to each other with the tube body portion 14 disposed therebetween, and the center line of the thickness of the first supporting section 17A and the center line of the thickness of the second supporting section 17B overlap the common straight line L1.

The tube body portion 14 is supported substantially in the center of the hollow space 15 inside the protector portion 16 by the first supporting section 17A and the second supporting section 17B, and is kept in a spaced position in which the tube body portion 14 is spaced from the inner surface 16a of the protector portion 16.

The tube 1 is provided with the supporting portion 17 (or the supporting sections 17A and 17B) which extends from the first flat wall 16A of the protector portion 16 in the direction substantially perpendicular to the flat outer surface of the first flat wall 16A and across the hollow space 15, and which accordingly supports the tube body portion 14 at the middle portion of the supporting portion 17. For this reason, in a case where the tube 1 is set on a belt conveyor 22 with the first flat wall 16A placed at the bottom thereof immediately after the extrusion molding, the supporting portion 17 functions as a supporting column and hence prevents the protector portion 16 from changing in shape or collapse due to its own weight (denoted by reference G in FIG. 6B).

In addition, in the tube 1 according to the present embodiment, the supporting portion 17 supports the tube body portion 14 at the middle portion thereof with the tube body portion 14 kept in the position spaced from the inner surface 16a of the protector portion 16. For this reason, even if the tube body portion 14 vibrates due to the flow of the washer fluid in the fluid channel 18 of the tube body portion 14, the supporting portion 17 suppresses the vibration of the tube body portion 14 while supporting the tube body portion 14, and thus preventing the tube body portion 14 from coming into contact with the inner surface 16a of the protector portion 16.

Furthermore, in the case of the tube 1 according to the present embodiment, the first flat wall 16A becomes an attachment portion to be fixed to the hood rear surface 3a facing the washer nozzles 4. This attachment scheme provides a better appearance to the washer tube, when the washer tube is viewed through the windshield 2.

Moreover, in the tube 1 according to the present embodiment, the supporting portion 17 supports the tube body portion 14 at the middle portion of the supporting portion 17. For this reason, even if the tube body portion 14 vibrates due to the flow of the washer fluid in the fluid channel 18 of the tube body portion 14, the tube body portion 14 will not come into contact with the protector portion 16, thus making the washer tube look better when the washer tube is viewed through the windshield 2.

In addition, in the case of the tube 1 according to the present embodiment, the supporting portion 17 is extended from its attachment portion to be fixed to the hood 3, which is a rigid body, in such a way that the supporting portion 17 overlaps the line perpendicular to this attachment portion. For this reason, the supporting portion 17 functions as a rib, thus increasing the attachment rigidity thereof.

Figure 6A:
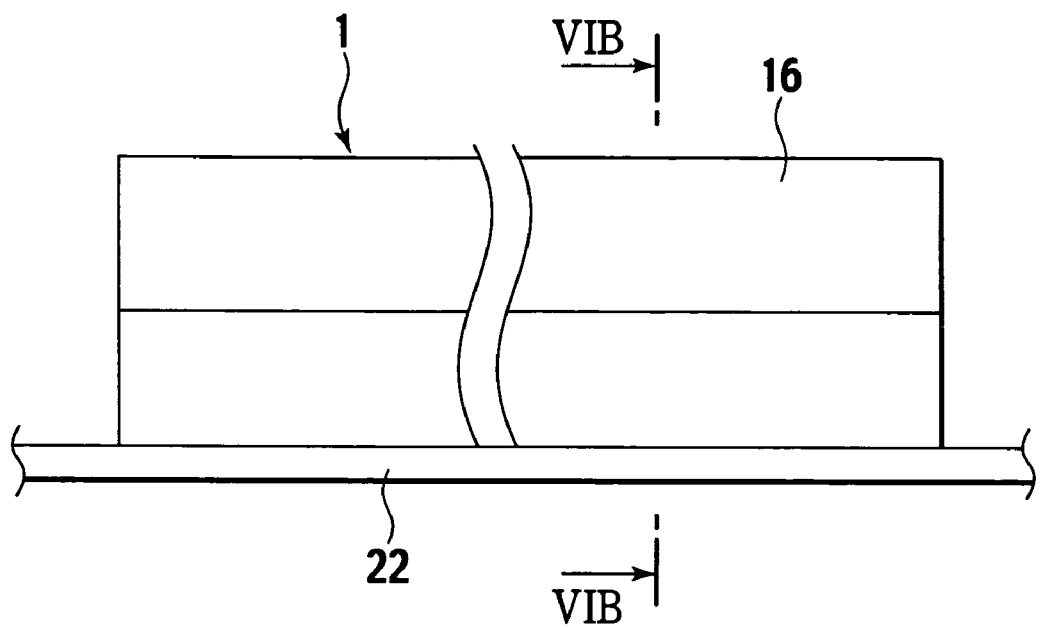
FIG. 6A shows the tube according to the first embodiment laid on a belt conveyor after an extrusion molding process which a rubber material is integrally formed into the tube.
Figure 6B:
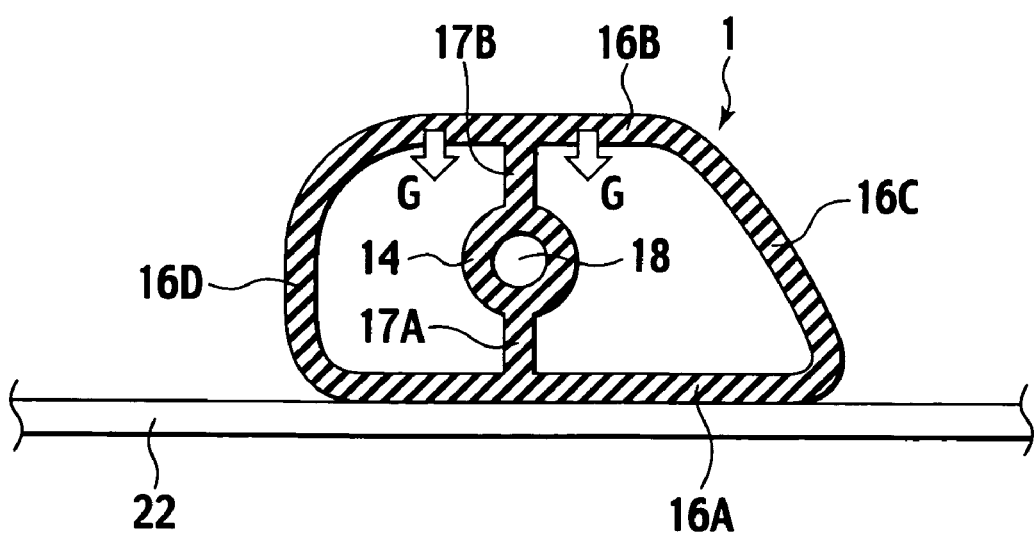
FIG. 6B is a cross-sectional view of FIG. 6 taken along the VIB-VIB line.

Furthermore, the tube 1 according to the present embodiment is to be conveyed on a belt conveyor 22, as shown in FIGS. 6A and 6B, after the tube 1 is formed by extrusion molding a rubber material into the tube 1. The tube 1 has the structure in which the tube body portion 14 is supported at the middle portion of the supporting portion 17, by the first supporting section 17A and the second supporting section 17B, which are located respectively above and under the tube body portion 14, with the tube body portion 14 kept in the position spaced from the inner surface 16a of the protector portion 16. For this reason, the supporting portion 17 functions as a supporting column, preventing the protector portion 16 from collapsing and changing in shape due to its own weight even if the tube has not become fully cured and solid yet. In other words, the supporting portion 17 prevents the second flat wall 16B of the protector portion 16 from drooping due to its own weight.

By contrast, a tube with any one of the following three structures allows the protector portion 16 or the tube body portion 14 to droop due to its own weight: a structure in which only the first supporting section 17A supports the tube body portion 14, a structure in which only the second supporting section 17B supports the tube body portion 14, or a structure in which the first supporting section 17A and the second supporting section 17B are arranged in parallel to the first flat wall 16A to support the tube body portion 14.

Second Embodiment

Figure 7:
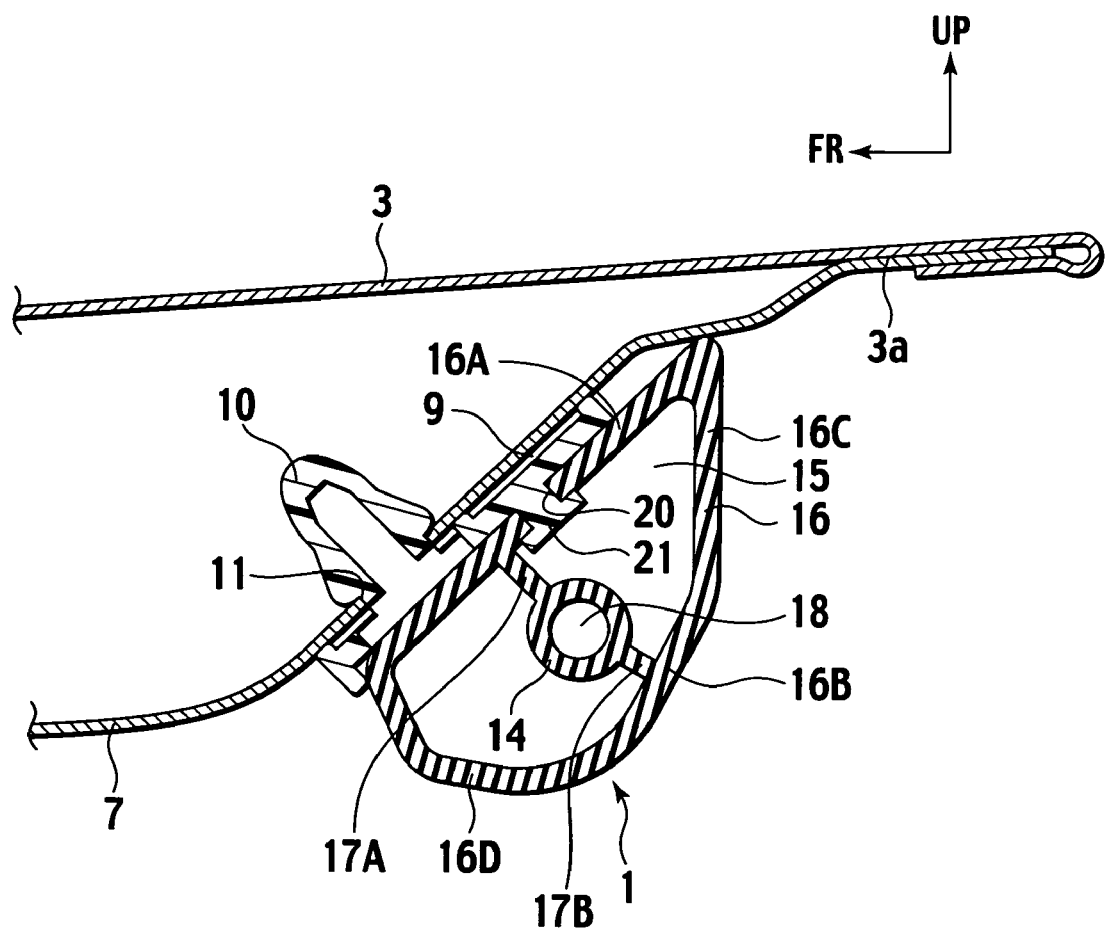
FIG. 7 shows how a tube according to a second embodiment of the present invention is arranged on the rear surface of the hood of the vehicle.

As shown in FIGS. 7 to 10, a tube 1 according to the second embodiment has the same structure as the tube 1 according to the first embodiment, except that the shape of a protector portion 16 and the arrangement of a supporting portion 17 (or supporting sections 17A and 17B) according to the second embodiment are different from those according to the first embodiment. For this reason, descriptions will be provided hereinbelow only for what makes the tube 1 according to the second embodiment different from the tube 1 according to the first embodiment. It should be noted that, like the tube 1 according to the first embodiment, the tube 1 according to the second embodiment is a windshield washer fluid supplying tube fixed to a rear surface 3a of a hood 3 facing a windshield 2, as shown in FIG. 7.

Figure 8:
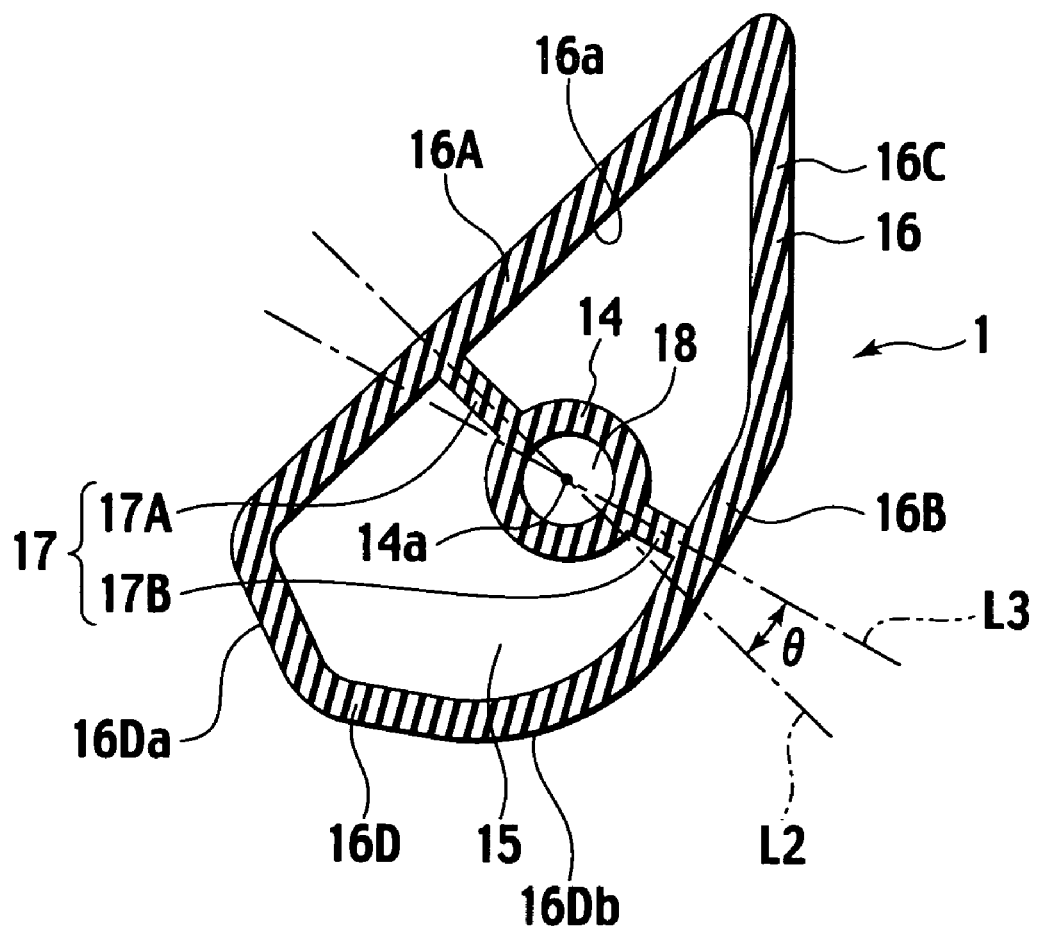
FIG. 8 is a cross-sectional view of the tube according to the second embodiment.

When viewing a cross-section of the tube 1 according to the second embodiment taken in a direction perpendicular to the longitudinal direction of the tube 1, as shown in FIG. 8, the tube 1 is formed to have a tube body portion 14, a protector portion 16, and a supporting portion 17. The protector portion 16 covers or surrounds the tube body portion 14, and includes a hollow space 15 in its inside. The tube body portion 14 is provided through the hollow space 15. The supporting portion 17 supports the tube body portion 14 with the tube body portion 14 kept in the position spaced from an inner surface 16a of the hollow space 15 in the protector portion 16.

The protector portion 16 is formed to have a first flat wall 16A, a second flat wall 16B, a first connecting section 16C, and a second connecting section 16D. The first flat wall 16A is attached to the hood rear surface 3a. The second flat wall 16B is arranged in a position opposed to the first flat wall 16A with the tube body portion 14 disposed between the first flat wall 16A and the second flat wall 16B, and is not in parallel to the first flat wall 16A, but inclined with respect to the first flat wall 16A. The first connecting section 16C connects one end of the first flat wall 16A to one end of the second flat wall 16B. The second connecting section 16D connects the other end of the first flat wall 16A to the other end of the second flat wall 16B. The first flat wall 16A, the second flat wall 16B, the first connecting section 16C, and the second connecting section 16D jointly forms a hollowed structure. The tube body portion 14 is arranged substantially in the center of the hollow space 15 of the hollowed structure.

The first flat wall 16A is attached to the hood inner 7 provided to the hood rear surface 3a. Clip member attaching holes 20 to which the corresponding clip members 9 are attached are formed in the first flat wall 16A. A locking protrusion 21 provided to each of the clip members 9 is inserted and locked into a corresponding one of the clip member attaching holes 20.

The first connecting section 16C is formed as an inclined wall inclined at an acute angle with respect to the first flat wall 16A. The first connecting section 16C connects one end of the first flat wall 16A (or the upper right end of the first flat wall 16A in FIG. 8) and one end of the second flat wall 16B. The second connecting section 16D is formed as a combination of an inclined wall 16Da inclined at an obtuse angle with respect to the first flat wall 16A with an arc-shaped section 16Db which forms a curved surface smoothly continuing to the inclined wall 16Da. The second connecting section 16D connects a base end of the first flat wall 16A (or the lower left end of the first flat wall 16A in FIG. 8) to a base end of the second flat wall 16B.

The supporting portion 17 is provided to the tube 1 so as to extend from the first flat wall 16A in a direction substantially perpendicular to the flat outer surface of the first flat wall 16A and across the hollow space 15. The supporting portion 17 supports the tube body portion 14 at the middle portion of the supporting portion 17. The supporting portion 17 extends along the tube body portion 14 in its longitudinal direction so as to support the tube body portion 14 in the longitudinal direction thereof.

The supporting portion 17 is formed to have a first supporting section 17A and a second supporting section 17B. The first supporting section 17A is arranged on a straight line L2 which passes through a center 14a of the tube body portion 14 with a circular cross-section, and which is perpendicular to the flat outer surface of the first flat wall 16A. The second supporting section 17B is arranged on a straight line L3 which passes through the center 14a of the tube body portion 14, and which is perpendicular to the flat outer surface of the second flat wall 16B.

The second supporting section 17B is not arranged in the tube 1 in such a way that the center line of the thickness of the second supporting section 17B overlaps the center line of the thickness of the first supporting section 17A. The second supporting section 17B is arranged in the tube 1 so as to be inclined toward the first connecting section 16C. In other words, the center line of the thickness of the first supporting section 17A and the center line of the thickness of the second supporting section 17B has a positional relationship in which the two center lines cross over each other at an angle 6 at the center 14a of the tube body portion 14. The tube body portion 14 is supported substantially in the center of the hollow space 15 of the protector portion 16 by the first supporting section 17A and the second supporting section 17B with the tube body portion 14 kept in the position spaced from the inner surface 16a.

Similarly to the tube according to the first embodiment, the tube 1 according to the second embodiment is provided with the supporting portion 17 which extends from the first flat wall 16A of the protector portion 16 in the direction substantially perpendicular to the flat outer surface of the first flat wall 16A and across the hollow space 15, and which accordingly supports the tube body portion 14 at the middle portion of the supporting portion 17. For this reason, in a case where the tube 1 is set on a flat horizontal surface with the first flat wall 16A placed at the bottom, the supporting portion 17 functions as a supporting column, thus preventing the protector portion 16 from changing in shape or collapsing due to its own weight.

In addition, the supporting portion 17 supports the tube body portion 14 at the middle portion of the supporting portion 17 with the tube body portion 14 kept in the position spaced from the inner surface 16a of the protector portion 16. For this reason, even if the tube body portion 14 vibrates due to the flow of the washer fluid in the fluid channel 18 of the tube body portion 14, the supporting portion 17 functions as a supporting column to suppress the vibration of the tube body portion 14, accordingly preventing the tube body portion 14 from coming into direct contact with the inner surface 16a of the protector portion 16.

Figure 9A:
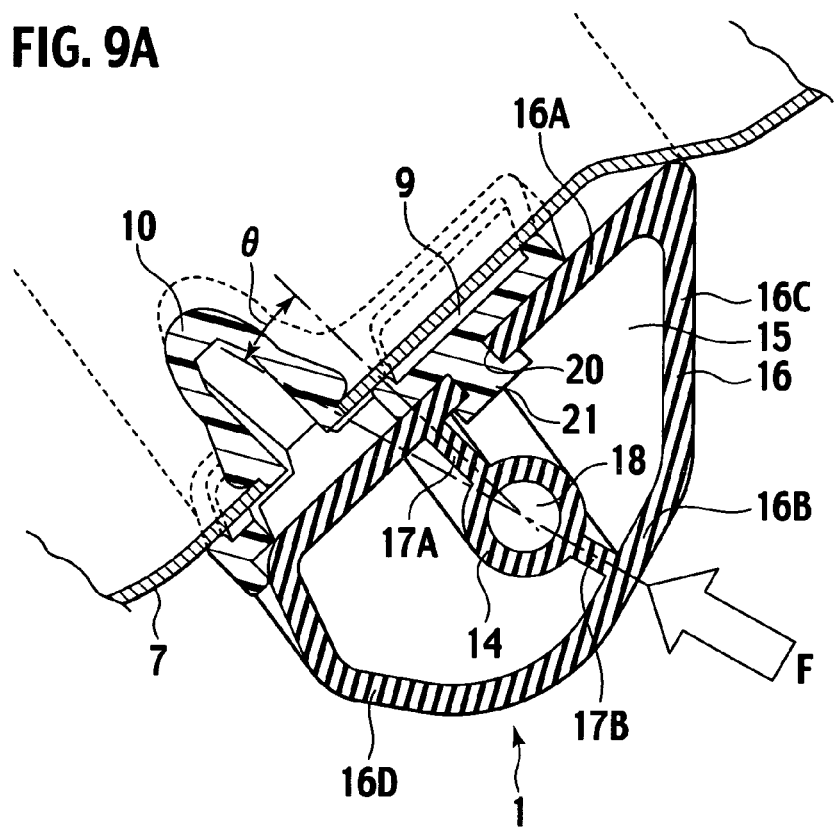
FIGS. 9A and 9B show how the tube according to the second embodiment behaves when an external force is applied to its protector portion.
Figure 9B:
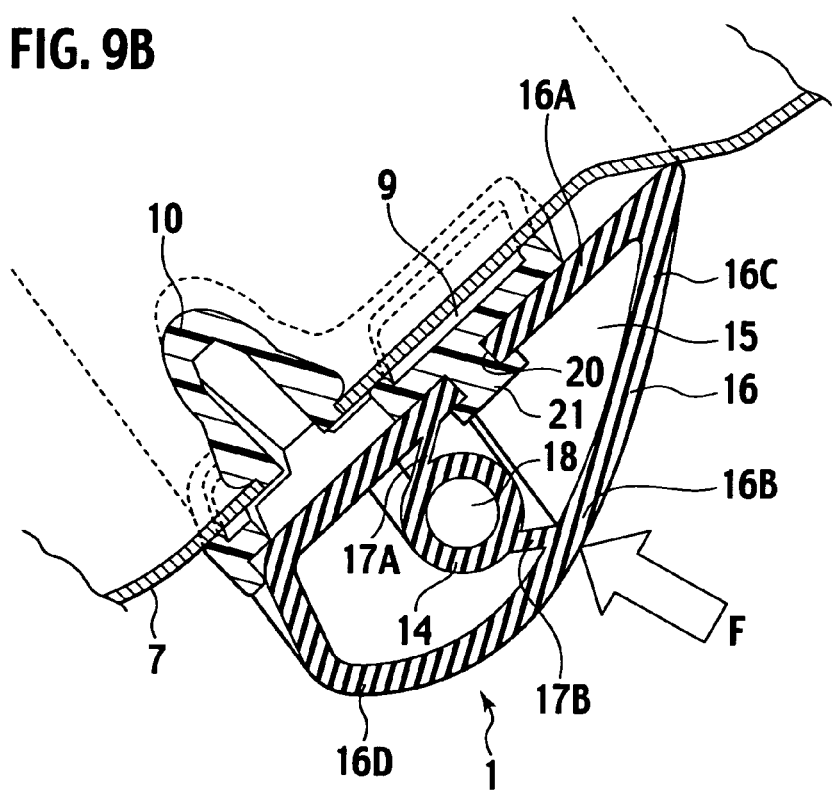

Furthermore, even in a case where, for example, an external force F is applied to the second flat wall 16B of the protector portion 16 of the tube 1 according to the second embodiment, the supporting portion 17 deforms so as to shift the tube body portion 14 sideway or in a direction substantially perpendicular to the direction of the external force F, thus preventing the tube body portion 14 from deforming. Specifically, in a case where an external force F is applied to the second flat wall 16B of the protector portion 16 as shown in FIG. 9A, the second flat wall 16B is pushed and moved toward the first flat wall 16A by the external force F, as shown in FIG. 9B. At this time, because the second flat wall 16B is inclined with respect to the first flat wall 16A and the first and second supporting sections 17A and 17B are perpendicular to the first and second flat walls 16A and 16B, respectively, or because the center line of the thickness of the first supporting section 17A and the center line of the thickness of the second supporting section 17B do not overlap any single straight line, but cross over each other at the predetermined angle θ, a side force to bend the first supporting section 17A and the second supporting section 17B and to shift the tube body portion 14 sideway toward the second connecting section 16D is produced, thereby effectively reducing the pressure applied to the tube body portion 14. As a result, the tube body portion 14 is prevented from being collapsed or crushed between the first supporting section 17A and the second supporting section 17B.

Moreover, in the case of the tube 1 according to the second embodiment, similarly to the case of the tube according to the first embodiment, the first flat wall 16A is used as its attachment portion which is fixed to the hood rear surface 3a facing the washer nozzles 4 of the vehicle. This attachment scheme makes the washer tube look better, when the washer tube is viewed through the windshield 2.

Moreover, in the tube 1 according to the second embodiment, the supporting portion 17 supports the tube body portion 14 at the middle portion of the supporting portion 17. For this reason, even if the tube body portion 14 vibrates due to the flow of the washer fluid in the fluid channel 18 of the tube body portion 14, the tube body portion 14 will not come into contact with the protector portion 16, thus making the washer tube look better when the washer tube is viewed through the windshield 2.

In addition, in the case of the tube 1 according to the second embodiment, the supporting portion 17 is provided to the tube 1 so as to be extended from its attachment portion fixed to the hood 3, which is a rigid body, so that the supporting portion 17 overlaps the line perpendicular to this attachment portion. For this reason, the supporting portion 17 functions as a rib, thus increasing the attachment rigidity thereof.

Figure 10:
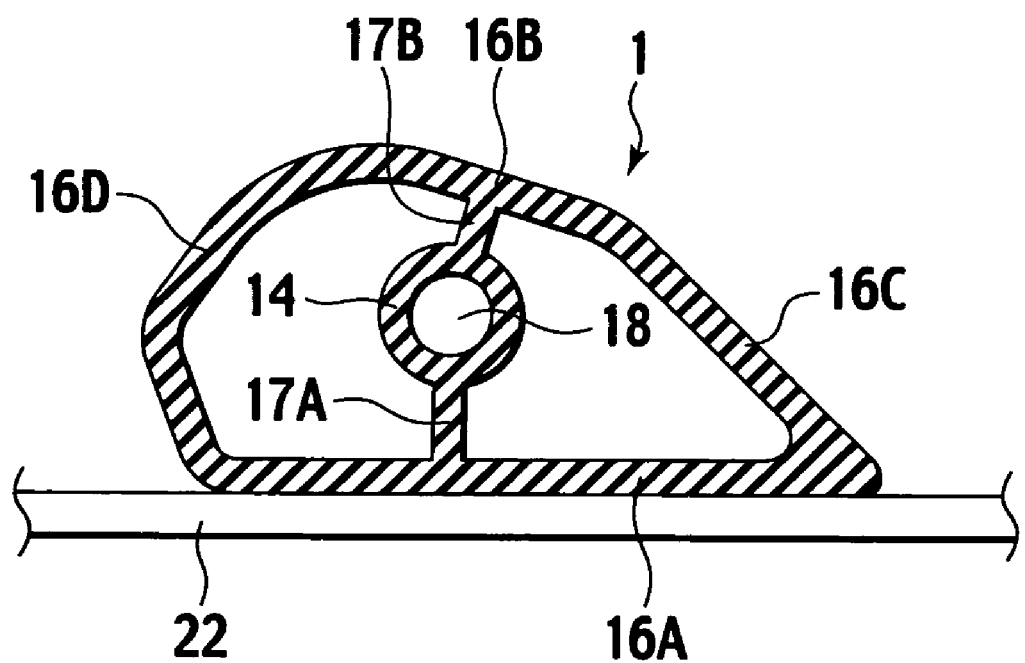
FIG. 10 shows how the tube according to the second embodiment, which is integrally formed by extrusion molding a rubber material into the tube, is laid on a belt conveyor, and is a diagram corresponding to FIG. 6B.

Furthermore, the tube 1 according to the second embodiment is to be conveyed on a belt conveyor 22, as shown in FIG. 10, after the tube 1 is formed by extrusion molding a rubber material into the tube 1. The tube 1 has the structure in which the tube body portion 14 is supported at the middle portion of the supporting portion 17, by the first supporting section 17A and the second supporting section 17B, which are located respectively above and under the tube body portion 14, with the tube body portion 14 kept in the position spaced from the inner surface 16a of the protector portion 16. For this reason, the supporting portion 17 functions as a supporting column, preventing the protector portion 16 from collapsing and changing in shape due to its own weight even if the tube has not become fully cured and solid yet. In other words, the supporting portion 17 prevents the second flat wall 16B of the protector portion 16 from drooping due to its own weight.

The preferred embodiments described herein are illustrative and not restrictive, and the invention may be practiced or embodied in other ways without departing from the spirit or essential character thereof.

In the foregoing embodiments, the first flat wall 16A is used as the attachment portion to be attached to the hood rear surface 3a. Even if, instead, the second flat wall 16B is used as the attachment to be attached to the hood rear surface 3a, the tube brings about the same functioning effects as the tubes according to the foregoing embodiments.

The scope of the invention being indicated by the claims, and all variations which come within the meaning of claims are intended to be embraced herein.

The present disclosure relates to subject matters contained in Japanese Patent Application No. 2007-170912, filed on Jun. 28, 2007, and Japanese Patent Application No. 2008-034713, filed on Feb. 15, 2008, the disclosures of which are expressly incorporated herein by reference in their entireties.

What is claimed is:

1. A tube comprising:
a tube body portion through which a fluid flows,
a protector portion having an interior hollow space in which the tube body portion is provided, and an exterior wall defining the interior hollow space, wherein the exterior wall includes a first flat wall and a second flat wall which are arranged in positions opposed to each other with the tube body portion disposed therebetween, the second flat wall being inclined with respect to the first flat wall, and
a single supporting portion supporting the tube body portion inside the hollow space in a position spaced from an inner surface of the hollow space,
wherein the single supporting portion extends from the exterior wall of the protector portion and across the hollow space to support the tube body portion at a middle portion thereof,
wherein the single supporting portion is adapted to deform to prevent the tube body portion from deforming when an external force is applied to the protector portion, the single supporting portion consisting of:
a first supporting wall extending from the exterior wall, the first supporting wall being aligned with a first line that is perpendicular to the first flat wall and passing through a center of the tube body portion; and
a second supporting wall arranged in a position opposed to the first supporting wall with the tube body portion disposed between the first and second supporting walls, the second supporting wall being aligned with a second line that is perpendicular to the second flat wall and passing through the center of the tube body portion, wherein the first line and the second line intersect at a non-zero angle.

2. The tube according to claim 1, wherein the supporting portion extends along the tube body portion in its longitudinal direction.

3. The tube according to claim 1, wherein any one of the first flat wall and the second flat wall is configured to be fixed to a rear surface of a hood facing a windshield of a vehicle, and a washer fluid to flow in the tube body portion.

4. The tube according to claim 1, wherein the tube body portion, the protector portion and the supporting portion are integrally formed by extrusion molding a rubber material.

* * * * *